United States Patent

[11] 3,591,266

[72] Inventor Walter A. Ried
 Crestwood, Mo.
[21] Appl. No. 864,633
[22] Filed Oct. 8, 1969
[45] Patented July 6, 1971
[73] Assignee John W. Higginbotham
 St. Louis, Mo.
 a part interest

[54] AUTOMATICALLY SYNCHRONIZED VISUAL AND SOUND RECORDING AND PRESENTATION SYSTEM
 13 Claims, 9 Drawing Figs.

[52] U.S. Cl. ............................................. 352/27
[51] Int. Cl. ........................................... G03b 31/32
[50] Field of Search ................................. 352/5, 27,
 29, 30; 179/100.2 RE

[56] References Cited
UNITED STATES PATENTS

| | | | |
|---|---|---|---|
| 1,965,173 | 7/1934 | Canton | 352/27 |
| 2,480,162 | 8/1949 | Rath | 352/5 |
| 2,512,015 | 6/1950 | Graveel | 179/100.2 |
| 2,683,254 | 7/1954 | Anderson et al. | 333/30 |
| 2,729,454 | 1/1956 | Vides | 352/29 |

Primary Examiner—S Clement Swisher
Attorney—Robert J. Schaap

ABSTRACT: A system for recording sound on a synchronous time basis with respect to a visual image and automatically reproducing the sound and the visual image on a synchronous time basis. In one embodiment of the invention, a camera employs a magnetic drum which is operatively connected to the shutter mechanism of the camera. The drum serves as a mechanical delay mechanism for temporarily retaining the sound until the film has advanced to a point where the sound can be recorded on a film tract in synchronous time relationship to exposure of visual images on a film. After the message has been recorded on the film, an erase mechanism removes the message so that an unrecorded portion of the drum is moved into a position for receipt of a new sound message. A projector capable of presenting the film sound and visual image on a synchronous time basis also employs a magnetic drum as a mechanical delay mechanism. Another embodiment of the invention provides a magnetic belt system which replaces the drum as a mechanical delay mechanism. In addition, a third embodiment where the film itself serves as a delay mechanism is also provided.

PATENTED JUL 6 1971

INVENTOR
WALTER A. RIED

BY Robert J. Schaup
ATTORNEY

AUTOMATICALLY SYNCHRONIZED VISUAL AND SOUND RECORDING AND PRESENTATION SYSTEM

This invention relates in general to certain new and useful improvements in visual and sound recording and presentation systems, and more particularly to a technique for recording sound messages on a film in synchronous time relation to the exposure of the film; and to a technique for reproducing the images on the film in synchronous time relation to the sound recorded on the film.

In recent years, amateur cinematography has been achieving increasing prominence as a leisure time activity. Furthermore, many of the amateur cinematographic enthusiasts have expressed interest in producing sound recorded moving picture films or so-called "movie films.". However, many of the commercially available sound recording movie cameras suffer from a number of drawbacks, the most prominent of which is the substantial cost involved in the purchase of such cameras. The same drawbacks generally hold true in the projectors which are capable of displaying the visual image as well as the recorded sound.

There are a number of systems which have been employed in the manufacture of cinematographic projectors and cameras which record and present sound as well as photograph and present the visual image. One of the widely used techniques involves optical sound recording on a film sound track such as by intensity modulation where a light beam is modulated in proportion to the sound in order to record the sound on a film sound track. Another optical technique which is known as the variable area technique employs a mask to vary the width of the sound track in proportion to the sound level. When the film track is developed, the unrecorded areas will be essentially black and the light recording will produce a wave pattern corresponding to the sound at a rate proportional to the frequency of the sound. A photocell is generally employed to sense the light-modulated sound.

Another system which has been employed in the production of sound movie films involves the attaching of a magnetic strip to the photosensitive film. Sound levels are recorded on a magnetic strip in the same manner as they are recorded on a magnetic tape in a tape recorder. As a modification of this technique, the magnetic strip may be affixed to the film after processing of the film. The visual image presented by each frame on the film is synchronized with the sound by means of synchronous pulses.

One additional technique which has been employed involves the recording of sound on a separate medium with respect to the film. The sound level is never transferred to the film but reproduced from a tape recorder. The tape recorder is generally interfaced to the projector with synchronous pulses so that in essence the projector is operated by the tape recorder.

There are a number of drawbacks to each of the aforesaid techniques, the most significant to the amateur photographer being that of the substantial cost of the cameras and projectors. One other serious drawback resides in the editing of the film. It is naturally desirable to obtain lip syncing sound so that the sound produced is presented on a completely synchronous time basis with the visual by the projector. However, in practically all of the available amateur movie cameras, a momentary cessation of film movement occurs behind the lens, which is typically every one-sixteenth of a second. Furthermore, sound can only be recorded on a moving medium. The commercial cameras utilize synchronous tape machines to edit and obtain lip syncing sound. However, systems of this type are quite expensive and do not lend themselves for amateur use. In the other techniques previously described, the sound level may be recorded on the film substantially in advance of the visual image to which the sound is related.

Typically, the sound may be recorded several frames in advance of visual image recordation on the film. For example, with an 8 millimeter film, the sound is recorded 52 frames in advance of the visual image recordation. Presentation of the film visual images on a lip syncing sound basis does not create a serious problem if the projector has a sound producing and image producing mechanism substantially similar to that of the camera. However, it is most difficult to edit films by such means as film splicing techniques since one must correlate the messages on the sound track with the various image frames on the visual image track; and typically the messages on the sound track may have been recorded some 52 frames or more in advance of the associated frames on the visual image track. Accordingly, film editing has become a very arduous task for the amateur cinematographer who wishes to record sound in relation to the visual image.

It is, therefore, the primary object of the present invention to provide a sound movie camera where the sound can be completely synchronized with the visual image to which it is related.

It is another object of the present invention to provide a projector of the type stated which is capable of producing the sound on a synchronous time basis with the visual image in order to obtain substantially perfect lip sync sound.

It is another object of the present invention to provide a camera of the type stated where the sound level can be recorded on a sound track in a substantially adjacent position to a related visual image which has been recorded on the image track of the film, thereby affording easy and convenient editing of the film.

It is an additional object of the present invention to provide a method of producing a sound-movie film which requires no special processing.

It is another salient object of the present invention to provide both a camera and projector of the type stated which can be manufactured on a mass production basis at a relatively economical cost and which camera and projector are highly reliable and efficient in operation.

With the above and other objects in view, my invention resides in the novel features of form, construction, arrangement, and combination of parts presently described and pointed out in the claims.

GENERAL DESCRIPTION

Generally speaking, the present invention relates to a camera which is capable of temporarily retaining a sound which has been recorded simultaneously with the producing of a visual image on a light sensitive film. The sound is temporarily recorded on a magnetic element until the film passes from the point of establishing the visual image so that the sound associated with such visual image can be appropriately recorded on a film sound track in a position adjacent to the visual image. The projector of the present invention is similar to the camera in that it temporarily retains the sound level sensed on the film track and presents the same audibly at coincident times with the presentation of the visual image from the lens of the projector.

More specifically, one of the embodiments of the camera employs a supply spool capable of supplying photosensitive film to a shutter mechanism where the visual images are produced on the photosensitive portion of the film track in response to actuation of the shutter mechanism. The film is passed through appropriate sprockets to a takeup spool. A microphone senses the sound and transmits the same to a magnetic drum by means of a recording head.

The drum rotates for a predetermined amount of time so that a reproducing head can sense the recorded message and transmit the same to another recording head located to record the sound message on the film at a synchronous time with respect to the visual image. It can thus be seen that the amount of rotation of the drum is proportional to the distance that the film moves between the point of visual image exposure and the point where the sound message is recorded on the film. An erase head is also employed for removing the message from the drum after it has been transferred to the film, so that a new unrecorded section of the drum can be placed in position for receiving the new message.

The projector of the present invention is similar to the camera previously described and employs a supply spool which is capable of supplying the recorded film to a lens-shutter mechanism for production of the visual image. Prior to the passage of the film behind the lens and shutter mechanism, the sound message on the film is recorded on a magnetic drum. Since the sound track may be optically recorded, a lamp and photocell are employed for sensing the sound message on the sound track. The photocell is connected to a record head which records the sound message on the magnetic drum. Thereafter, the film is passed between a lamp source and a lens and the visual image is projected by means of the shutter mechanism. However, as the film reaches the position of the shutter mechanism, the magnetic drum has been rotated to a position where a reproduce head senses the sound message on the drum and presents the sound message through a speaker system on a synchronous time basis to the presentation of the visual image. A takeup spool and the associated sprockets are also employed in the projector. In like manner, an erase head is located to remove the sound message from the drum after the same has been presented through the speaker system.

As an embodiment of the present invention, both the camera and the projector can be modified to employ a continuously moving magnetic belt trained over a pair of rollers, in place of the magnetic drum. The remainder of the camera and projector construction and the operation thereof is similar to the embodiments previously described.

As another embodiment of the present invention, the delay in the sound message can be created by using the film itself as a delay medium. In the camera of this embodiment a supply spool holding a supply of an unexposed film with a photosensitive emulsion supplies the film to a shutter mechanism for recording a visual image on the image track. The film includes a permanent sound track where the sound message can be optically recorded and an auxiliary sound track where the message can be magnetically recorded.

A magnetic recording head connected to a microphone is located to record a sound message on the auxiliary track simultaneously with the exposure of the visual image track of the film. However, the recording head is located to record the message at a point in advance of the image frame with respect to the direction of movement of the film. A reproducing head is located to read the message on the auxiliary track after exposure of the image frame. An optical recording mechanism is connected to the reproducing head is located to record the sound message by optical techniques on the permanent sound track at a point adjacent the image frame with which it is associated. An erase head removes the message on the auxiliary sound track after the message has been recorded on the permanent sound track. The distance between the recording head and the reproducing head is substantially equal to the distance between the shutter mechanism and the optical recording mechanism.

The projector in this latter embodiment is similar to the camera in that it employs a lamp and photocell in close proximity to the lamp, lens, and shutter mechanism. The photocell which senses the sound level in the permanent sound track transmits the signal to a recording head for reproducing the sound on a magnetic sound track at a point before the film reaches the photocell. The sound on the magnetic track is then sensed by a reproduce head which then transmits the sound level through a speaker system. Located between the reproduce head and the photocell and light source is an erase head for removing the message recorded on the magnetic sound track. The distance between the record head and the reproduce head with respect to the film is substantially equal to the distance between the photocell and the shutter mechanism so that the visual image can be produced and presented on a synchronous time basis for the presentation of the sound. In this embodiment, the sound from the permanent sound track can be indexed with other sounds recorded on the auxiliary track. If the sound is not erased from the auxiliary track, then the composite of the permanent and auxiliary tracks may be audibly recorded and presented in synchronization with the visual images recorded on the film.

DETAILED DESCRIPTION

Figures 1, 2, 3:
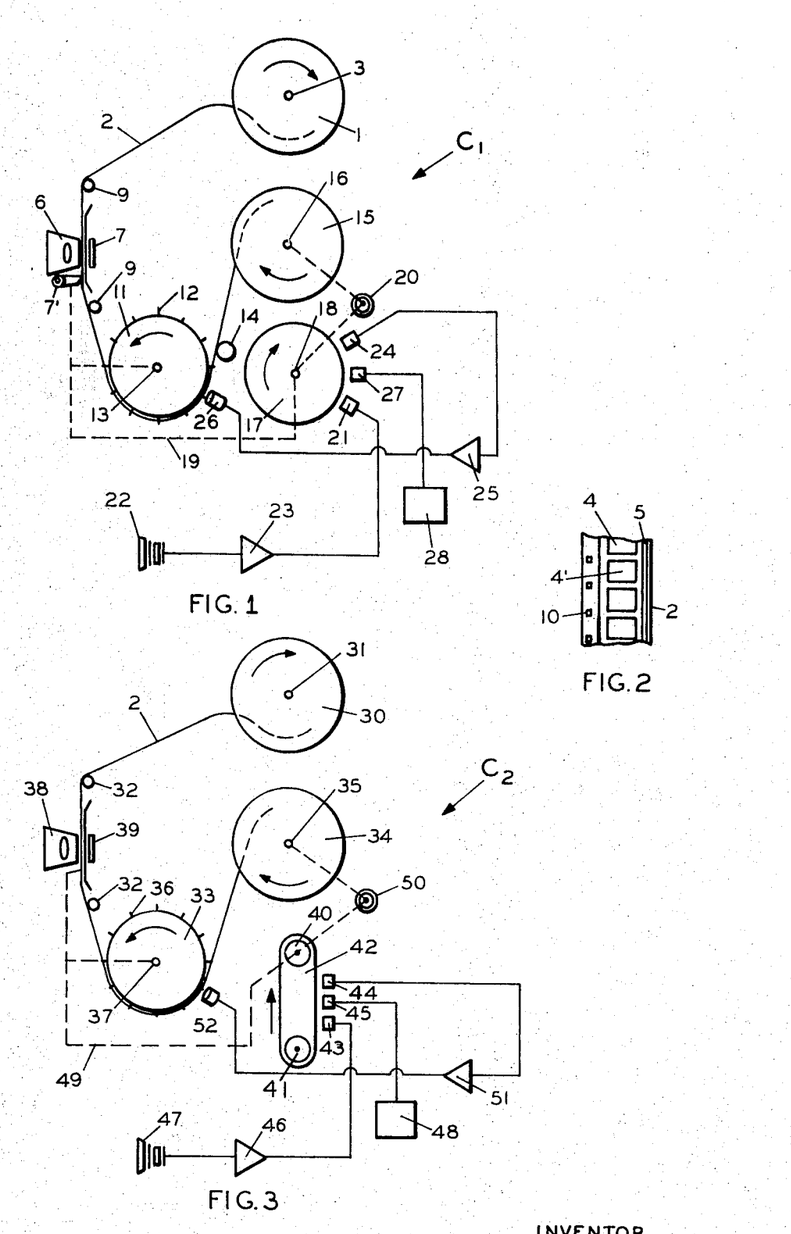
FIG. 1 is a schematic side elevational view of a camera constructed in accordance with and embodying the present invention.
FIG. 2 is a fragmentary side elevational view showing a portion of the film which can be used in the camera of FIG. 1 and the camera of FIG. 3.
FIG 3 is a schematic side elevational view of a modified form of camera constructed in accordance with and embodying the present invention.

Referring now in more detail and by reference characters to the drawings which illustrate practical embodiments of the present invention, $C_1$ designates a camera which is schematically illustrated in FIG. 1 and generally comprises a supply spool 1 containing an unrecorded photosensitive film 2. The supply spool 1 is preferably removably mounted on an idler spool shaft 3 and rotates in a clockwise direction, reference being made to FIG. 1.

The film 2 which is more fully illustrated in FIG. 2 includes a visual image track 4 formed by a photosensitive emulsion capable of forming an image in response to exposure to a source of light. On exposure, the visual image track will have a series of discrete frames 4' forming the visual images. The film 2 also includes a sound track 5, which is capable of having a sound message recorded thereon by optical techniques. However, it should be recognized that while the present invention has been described in terms of optically recording a sound message on the sound track 5, it is also possible to use other types of recording, such as magnetic recording within the confines of the present invention. The film 2 may also include one or a pair of sprocket tracks with sprocket apertures 10 located along the longitudinal margins thereof.

The film 2 is passed behind a lens 6 and a conventional shutter mechanism 7, and may be guided in a proper optical path by means of a pressure plate (not shown). The lens 6 is preferably of the type normally used in movie cameras. The shutter mechanism 7 is actuated in response to operation of the camera and is generally energized and deenergized by means of a trigger-switch (not shown). The shutter is of the type which normally opens and closes at approximately 16 frames per second to thereby form a series of discrete visual images frames 4' on the visual image track 4. A conventional claw 7' moves the film 2 past the lens 6 in the manner as illustrated in FIG. 1.

The film 2 is also trained around a pair of guide rollers 9 and is driven by means of a drive sprocket 11 which engages the sprocket apertures 10. By further reference to FIG. 1, it can be seen that the sprocket 11 is circumferentially provided with a series of teeth 12 for engagement with the sprocket apertures 10 to thereby urge the film through the shutter mechanism 7. The sprocket 11 is driven by means of a drive shaft 13. Furthermore, the film is trained about another guide roller 14 and secured to a takeup reel 15 which is conventionally and removably mounted upon a shaft 16. It should be observed that the sprocket 11 rotates in a counterclockwise direction, whereas the takeup spool 15 is rotated in a clockwise direction.

Also mounted within the camera $C_1$ is a magnetic drum 17 which is mounted upon a drum shaft 18 and is powered to rotate in the clockwise direction. The drum 17 is of the type normally used in magnetic recording for retaining either analogue or digital type of information and is capable of retaining frequencies representative of sound messages. By further reference to FIG. 1, it can be seen that the drive sprocket 11, the takeup spool 15 and the drum 18 are provided to rotate by the respective shafts through an appropriate gear coupling 19, the latter being illustrated in dotted lines. The actual structure for coupling each of the various shafts 13, 16 and 18 with the shutter mechanism 7 is conventional in its construction and is, therefore neither illustrated nor described in further detail herein. A slip clutch 20 is connected to the appropriate gear coupling and is interposed between the takeup spool 15 and the drum 17. As the amount of film 2 wound upon the spool 15 increases, the overall diametral size of the film 2 on the spool 15 will increase with respect to the diametral size of the magnetic drum 17. Accordingly the slip clutch 20 will be actuated in order to prevent any stretching or possible damage to the film 2.

A recording head 21 of the type normally used in tape recorders is disposed in recording contact with the surface of the drum 17 and is connected to a conventional microphone 22 through an amplifier 23. The microphone 22 is of the type normally employed in recording sound messages on magnetic drums and the signal from the microphone 22 is amplified by means of the amplifier 23 which is preferably an audio amplifier. The microphone 22 may contain a preamplifier. The amplifier 23 however, is preferably of the type which contains an automatic gain control and an output driver circuit. Thus, as the microphone 22 senses a sound message, it will general a signal which is amplified by the amplifier 23 and recorded on the surface of the drum 17 by means of the recording head 21. A reproducing head 24 is also located in contact with the surface of the drum 17 in a position which is delayed in time with respect to the location of the recording head 21 and the rotation of the drum 17. In other words, the reproducing head 24 will contact a discrete area of the drum which has previously had a message recorded thereon by the recording head 21. The reproducing head 24 is also similar to the heads normally found in magnetically operable tape recorders. The output of the reproducing head 24 is connected to an operational amplifier 25 which is in turn connected to an optical recording head 26. The recording head 26 is of the type which will optically record the sound message on the sound track 5. Furthermore, the recording head 26 is located in a position to record the audible message received by the reproducing head 24 and is also preferably located in close proximity to the drive sprocket 11.

It should be recognized that the distance between the recording head 21 and the reproducing head 24, measured in the direction of rotation of the drum 17 with respect to the speed of rotation of the drum 17, is substantially equal to the distance between the shutter mechanism 7 and the recording head 26 with respect to the speed of movement of the film 7. Thus, if $D_T$ represents the distance between the recording head 21 and the reproducing head 24 measured in direction of rotation of the drum 17, $S_T$ represents the speed of rotation of the drum 17, $D_F$ represents the film distance between the shutter mechanism 7 and the recording head 26, and $S_F$ represents the speed of movement of the film, the following relationship will hold true:

$$D_F/S_F = D_T/S_T$$

On this basis, the visual images and sound associated therewith will be recorded at the same point on the film.

As a message is sensed by the microphone 22 it will be transmitted to the recording head 21 and recorded on the drum 17 simultaneously with the creation of a visual image on the visual image track 4 of the film 2. As this frame 4' containing the visual image on the track 4 moves from the shutter mechanism 7 in the direction of movement of the film 2, the sound message which has been recorded on the magnetic drum 17, will be rotated with the drum in the clockwise direction. Furthermore, as the particular discrete frame 4' containing the visual image is moved to an area adjacent to the recording head 26, the sound message associated with that frame will be located beneath the reproducing head 24 which will, in turn transmit the message to the recording head 26. In like manner, the recording head 26 will record that particular sound message on the sound track 5 adjacent to the visual image frame 4' with which it is associated. Accordingly, it can be seen that a sound track 5 is created in an almost perfectly synchronous basis with respect to the visual image created on the visual image track 4, to thereby attain a lip sync sound.

After the sound message on the drum 17 has been read by the reproducing head 24, that particular portion of the message will be erased by means of an erasing head 27, which is operable by means of a bias oscillator 28. It is also possible to erase by means of a mechanism which will produce degradation characteristics. However, the bias oscillator has been found to be the most effective mechanism for energizing the erase head 27 for removal of the message from the drum 17. The erase head 27 is also similar to heads of the type normally found in tape recorders. It can thus be seen that the message which has been read by the reproducing head 24 is erased before being located beneath the recording head 21 in order to place a fresh unrecorded section of the drum 17 in recording position beneath the recording head 21.

It is also possible to provide a camera $C_2$, which is similar to the camera $C_1$ and which is more fully illustrated in FIG. 3. The camera $C_2$ generally includes a supply spool 30 which is mounted on an idler spool shaft 31 for supplying the film 2 in the direction of the arrow illustrated in FIG. 3. The film 2 is also trained around a pair of guide rollers 32 passed around a drive sprocket 33 and onto a takeup spool 34. It can be seen that the takeup spool 34 is similarly rotated in a clockwise direction by means of a powered spool shaft 35. The sprocket 33 is provided with gear teeth 36 for engagement of the sprocket apertures 10 and is also mounted on a drive shaft 37 which rotates in the counterclockwise direction. The film 2 is also located behind a conventional lens 38 and shutter mechanism 39, which are substantially similar to the aforementioned related components in the camera $C_1$. A pressure plate (not shown) for maintaining proper optical film path may also be employed.

A drive roller 40 and a cooperating idler roller 41 are also mounted in the camera $C_2$ and trained around these rollers 40, 41 is a continuous magnetic belt 42, the latter of which is rotated through the action of the drive roller 40 in a clockwise direction. It can also be seen that a recording head 43, a reproducing head 44, and an erasing head 45 are also located in contact with the recording surface of the magnetic belt 42 and operate in the same manner as the respective heads 21, 24, 27 in the camera $C_1$. For this purpose, the recording head 43 is connected through an operational amplifier 46 to a conventional microphone 47. Additionally, the erase head 45 is connected to a bias oscillator 48. The shutter mechanism 39, the drive shaft 37, the drive shaft 35, and the shaft upon which the drive roller 40 is mounted are all connected by means of a conventional gear train 49 in the same manner as the appropriate gear coupling 19 was employed in the camera $C_1$. A slip clutch 50 is likewise interposed between the drive roller 40 and the takeup spool 34.

The reproducing head 44 is connected through an operational amplifier 51 to an optical recording head 52. The recording head 52 is substantially identical to the head 26 and is capable of optically recording a sound message on the sound track 5. Thus, as an image is produced on the visual image track 4 of the film 2 by means of the shutter mechanism 39, the recording head 43 will record a sound message on the surface of the magnetic belt 42 as detected by the microphone 47. It should be observed that a visual image frame 4' will be formed on the visual image track 4 simultaneously with the recording of the message associated therewith on the continuous belt 42 by means of the recording head 43. The reproducing head 44 will produce that message as the belt rotates to a position under the reproducing head 44 and will transmit that message to the recording head 52.

It can thus be observed that the distance between the shutter mechanism 39 and the recording head 52, in the direction of movement of the film 2 with respect to the speed of movement of the film 2, is substantially identical to the distance between the recording head 43 and the reproducing head 44 as measured in the direction of rotation of the belt 42 with respect to the speed of rotation of belt 42, in the same manner as previously described. In like manner, the message will be erased by means of the erase head 45 before that section of the belt is again introduced under the recording head 43. It can be seen that the camera $C_2$, which employed a different type of delay mechanism operated in a manner substantially similar to the camera $C_1$.

Figures 4, 5, 6:
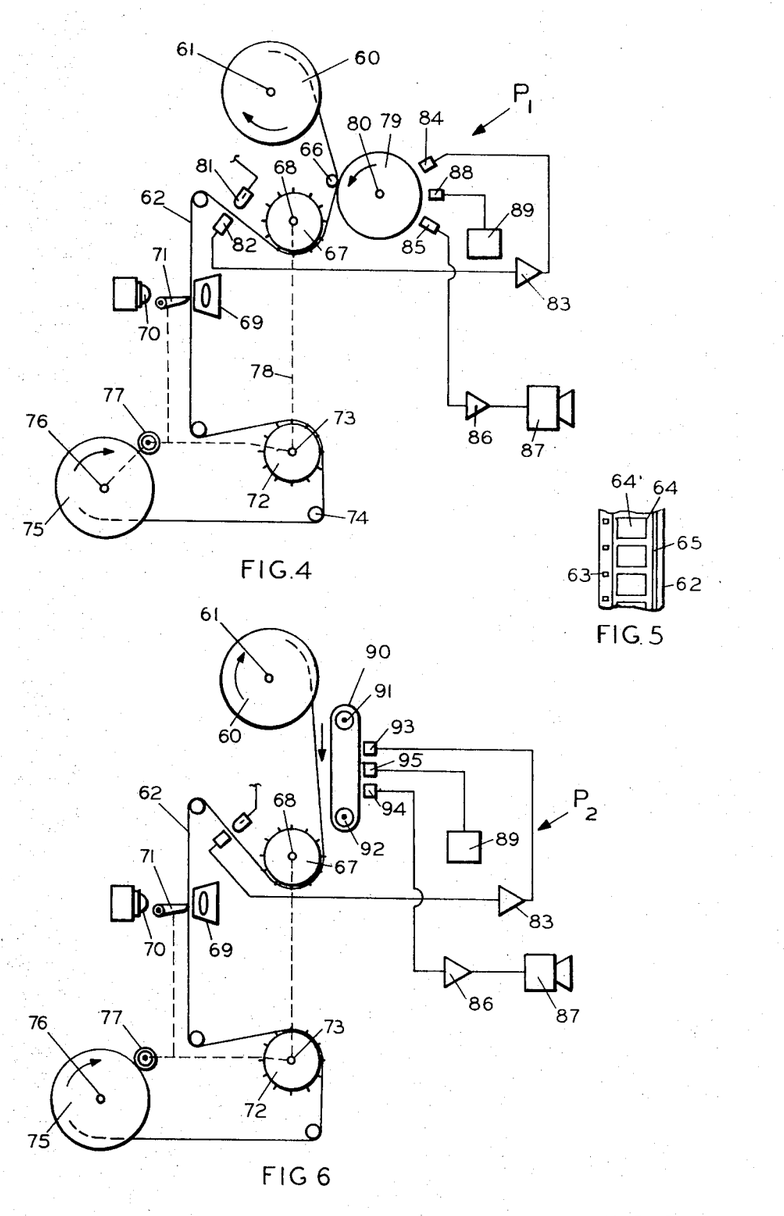
FIG. 4 is a schematic side elevational view of a projector constructed in accordance with and embodying the present invention.
FIG. 5 is a fragmentary side elevational view showing a portion of the film which can be used in the projector of FIG. 4 and the projector of FIG. 6.
FIG. 6 is a schematic side elevational view of a modified form of projector constructed in accordance with and embodying the present invention.

It is also possible to provide a projector $p_1$, which is more fully illustrated in FIG. 4. The projector $P_1$ is mounted in a housing (not shown) of the type normally used in movie projectors and includes a supply spool 60, which is mounted on an idler spool shaft 61 and supplies a film 62. It should be recognized that when the film 2 is exposed, a latent visual image is recorded on the image track 4. Proper processing of the film will enable the development of a negative visual image thereon. Therefore, the film 62 is essentially the processed film 2. The film 62 which is more fully illustrated in FIG. 5 includes a sprocket track along one of its longitudinal margins provided with sprocket apertures 63, a visual image track 64 having a series of discrete frames 64' forming visual images and a recorded message in a sound track 65.

A The film 62 is next trained around a guide roller 66 and around a drive sprocket 67 having teeth for engagement with the sprocket aperture 63. The sprocket 67 is driven by means of a drive shaft 68. The film is then passed between a lens 69 of the type normally found in projectors and a conventional lamp 70 having sufficient illumination to project an image through the lens 69. A conventional claw 71 moves the film past the lens in the manner as illustrated in FIG. 2. The claws are the type that are also normally found in projectors and are, therefore, neither illustrated nor described in further detail herein. However, it is pointed out that the claw will sequentially move each frame 64' in the visual image track 64 between the lens 69 and the lamp 70.

The film is next trained about a drive sprocket 72 which is mounted on a drive shaft 73, a conventional idler roller 74, and is collected on a takeup spool 75, the latter being mounted on a spool shaft 76. It should be observed that a conventional slip clutch 77 is interposed between the sprocket 72 and the takeup spool 75. A conventional gear mechanism 78 of the type normally found in projectors and illustrated by the dotted line is connected to the shaft 76, the slip clutch 77, the drive shaft 73, of the sprocket 72, the drive shaft 68 of the sprocket 67, the claw 71 for actuating each of these members in a time related basis.

The projector $P_1$ also includes a magnetic drum 79 which is substantially similar to the magnetic drum 17 in the camera $C_1$ and is rotated by a drum shaft 80, the latter also being connected to the conventional gear train 78 in the manner as illustrated 4. A conventional lamp 81 and a photocell 82 are located on opposite sides of the film in the manner as illustrated in FIG. 2. The lamp 81 is of the type suitable to illuminate the frequency recorded on the sound track 65 so that the same can be sensed by the photocell 82. Additionally, the lamp 81 is connected to a suitable source of electrical current (not shown). The photocell 82 82 is preferably one having junction characteristics. Accordingly, photocells formed of germanium, silicon, etc. are quite satisfactory. In addition, phototransistors and similar types of light sensitive transducers which have junction characteristics could be employed. The photocell 82 is connected through an operational amplifier 83 to a recording head 84 which is located in contact with the surface of the magnetic drum 79. Thus, as the photocell 82 detects a sound message on the sound track 65, it will transmit the same to the recording head 84 which will, in turn, record this sound message on the drum 79. A reproducing head 85, which is located in contact with the surface of the drum, will read this sound message as the drum rotates in a counterclockwise direction to the reading position beneath the reading head 85. The reading head 85 is, in turn, connected to an operational amplifier 86 and a loudspeaker 87 of the type normally used with movie projectors. The amplifiers 83, 86 as well as the loudspeaker 87 are conventional in their construction and are, therefore, neither illustrated nor described in further detail herein.

It is to be noted that the distance between the recording head 84 and the reproducing head 85, is measured in the direction of rotation of the drum 79 with respect to the speed of rotation of the drum 79, is substantially equivalent to the distance between the photocell 82 and the lens 69 with respect to the speed of movement of the film 62. Thus, as the frame 64 and the sound message associated therewith on the track 65 pass the photocell 82, the photocell 82 will read that portion of the message on the sound track 65. This message is recorded on the drum 79 by means of the recording head 84. As the drum rotates in the counterclockwise direction, the frame 64' will be moved into position between the lamp 70 and the lens 69. As the visual image located in the frame 64' is moved into the projecting position at the lens 69, the message recorded on the magnetic drum 79 will be moved into the reproducing position beneath the reproducing head 85. Thus, the visual image on the frame 64' is projected simultaneously with the presentation of the sound message on the sound track 65.

An erase head 88 which is operable by a bias oscillator 89 is also located in contact with the drum 79, in the manner as illustrated in FIG. 4. Thus, after the message has been produced by the reproducing head 85, it will be erased by means of the erase head 88 so that a fresh unrecorded portion of the magnetic drum 79 may be located beneath the recording head 84 for recording a new sound message. It can be observed that the projector $P_1$ is capable of producing a sound on a lip sync sound basis by means of this construction. Furthermore, the projector $P_1$ is compatible with the film produced by the camera $C_1$.

It is also possible to provide a projector $P_2$, which is more fully illustrated in FIG. 6. The projector $P_2$ is similar to the projector $P_1$, except that it also employs a continuous magnetic belt 90, which is trained about a drive roller 91 and an idler roller 92, in the same manner as the magnetic belt 42 is trained around the rollers 41, 42 in the camera $C_2$. In like manner, a recording head 93, a reproducing head 94, and an erase head 95, are all located in contact with the surface of the continuous magnetic belt 90. Thus, as the film 62 is brought into location between the lamp 81 and the photocell 82, a message will be recorded on the continuous belt 90 by means of the recording head 93. As the film continues to move and is located between the lens 69 and the lamp 70, a visual image will be projected at the same time that the magnetic belt 90 locates the message beneath the reproducing head 94. Accordingly, the sound will be presented on a sync time basis with the visual image. Moreover, the erase head 95 will erase the message after reproducing thereof so that a fresh unrecorded section of the magnetic belt 90 can be placed in the recording position for receipt of a new message. The remainder of the operation of the projector $P_2$ is substantially identical to the operation of the projector $P_1$.

Figures 7, 8, 9:
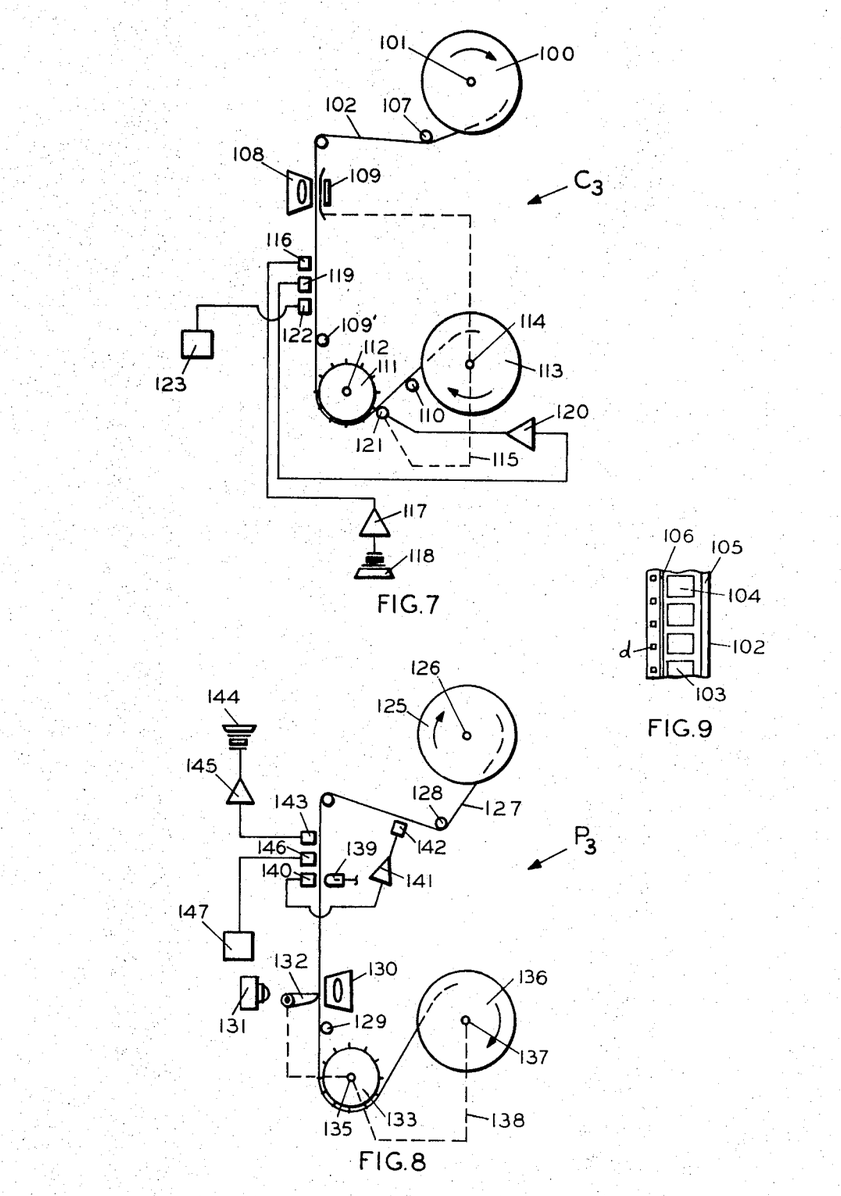
FIG. 7 is a schematic side elevational view of another modified form of camera constructed in accordance with and embodying the present invention.
FIG. 8 is a schematic side elevational view of another modified form of projector constructed in accordance with and embodying the present invention.
FIG. 9 is a fragmentary side elevational view showing a portion of the film which can be used in the camera of FIG. 7 and the projector of FIG. 8.

It is also possible to provide a camera $C_3$, which is more fully illustrated in FIG. 7. The camera $C_3$ generally comprises a supply spool 100, which is mounted on a spool shaft 101 for supplying a photographic film 102. The film 102 which is more fully illustrated in FIG. 9 has a track of sprocket apertures located along one longitudinal margin of the film 102. The film 102 also includes a visual image track 103 formed by a photosensitive emulsion capable of forming an image in response to exposure to a source of light. On exposure, the visual image track 103 will have a series of discrete frames 104 forming the visual images. In addition, the film 102 also includes a permanent sound track 105 which is capable of having a sound message recorded thereon by optical techniques. An auxiliary sound track 106 which is provided with a strip of magnetic coating is also located on the film 102. It should be recognized that the auxiliary sound track may be located in essentially any position on the film 102, such as being adjacent the sound track 105 or located on the other side of the image track 103 with respect to the sound track 105.

The film 102 is trained about a guide roller 107 and passed behind a lens 108 and a shutter mechanism 109 and may be guided in a proper optical path by means of a pressure plate (not shown). Both the lens 108 and the shutter mechanism 109 are preferably of the type normally used in movie cameras. In like manner the shutter mechanism 109 is actuated in response to operation of the camera and by means of a trigger-switch (not shown). Opening and closing of the shutter will form a series of discrete image frames 104 on the visual image track 103. The film 102 is next trained about a pair of guide rollers 109', 110 in the manner as illustrated in FIG. 7 and around a sprocket 111. The sprocket 111 is provided with radially extending teeth which engage the apertures $d$, and is mounted on a sprocket shaft 112 which rotates in the counterclockwise direction. The film 102 is then wound on a takeup spool 113 which is removably mounted on a spool shaft 114 rotating in the clockwise direction.

By further reference to FIG. 7 it can be seen that the takeup spool 113 and the sprocket 111 are powered to rotate by the respective shafts 114 and 112 through an appropriate gear coupling 115, the latter being illustrated in dotted lines. The shutter mechanism 109 is also connected to this gear coupling 115 in order to operate in a time related basis to the rotation of the sprocket 111 and the takeup spool 113. Again the actual structure for the coupling is conventional in its construction and is therefore neither illustrated nor described in further detail herein.

A magnetic recording head 116 is located below the lens 108 in the direction of movement of the film 102 and is located to record sound messages on the auxiliary sound track 106. The recording head 116 is connected through an operational amplifier 117 to a conventional microphone 118. The microphone 118 is of the type normally used in recording messages on magnetic tapes and when the microphone 118 senses a sound message, it will generate a signal which is amplified by the amplifier 117 and record the message on the auxiliary track 106 by means of the recording head 116. It should be observed that at this point in time, the message is recorded on the track 106 adjacent a portion of the visual image track 103 which has not been exposed.

Located on the underside of the lens 108 is a reproducing head 119 which engages the auxiliary track 106 and is capable of sensing the sound message recorded thereon by the recording head 116. The reproducing head 119 is connected through an operational amplifier 120 to an optical recording head 121. The optical recording head is located to optically record sound messages on the permanent sound track and is similar to the optical recording head 26 used in the camera $C_1$. The reproducing head 119 is similar to heads of this type normally found in magnetically operable tape recorders. After the sound message on the auxiliary track 106 has been sensed by the reproducing head 119 and recorded on the permanent sound track 105, the message on the auxiliary track 106 can be erased by means of an erase head 122 which is connected to a conventional bias oscillator 123. It should also be observed that the erase head is located adjacent to the auxiliary track 106 and is of the type normally found in magnetically operable tape recorders.

The distance between the recording head 116 and the reproducing head 119 is substantially equal to the distance between the shutter mechanism 109 and the optical recording mechanism 121, as measured in the direction of movement of the film 102. It can be seen that the sound message is recorded on the auxiliary track 105 simultaneously with the recording of a visual image frame 104 on the visual image track 103, but in advance of the frame 104, with respect to the movement of the film 102. As the sound message passes the reproducing head 119 it will detect the message and transmit the same to the optical recording head 121. It is to be observed that as the message is being reproduced by the reproducing head 119, the image frame 104 associated with that sound message will be located adjacent to the optical recording head 121. Thus, the message read by the reproducing head will be reproduced on the permanent sound track 105 by the head 121 adjacent to the image frame 104 with which it is associated. It should be recognized that other types of recording could be used on the permanent sound track 105 in place of the optical recording technique.

It is possible to provide a projector $P_3$ which is illustrated in FIG. 8 and which operates on a principle similar to the camera $C_3$. The projector $P_3$ is mounted in a housing (not shown) of the type normally used in movie projectors and includes a supply spool 125 removably mounted on a spool shaft 126. The supply spool 125 contains film 127 which is substantially identical to the film 102 which has been processed for use in projectors. Accordingly, this film is neither described nor illustrated in further detail herein.

The film 127 is trained about a pair of guide rollers 128, 129 in the manner as illustrated in FIG. 8 and is passed between a lens 130 and a conventional lamp 131 of the type normally found in projectors. The lamp 131 is designed to have sufficient illumination to project an image through the lens 130. A conventional claw 132 moves the film past the lens 130 in the manner as illustrated in FIG. 8. Again these claws are of the type normally found in projectors and are, therefore, neither illustrated nor described in further detail herein. However, it is pointed out that the claw 132 will sequentially move each frame 104 of the film 127 between the lens 130 and the lamp 131.

The film is next trained about a sprocket 133 having radially extending teeth to engage the sprocket apertures $d$. The sprocket is mounted on a sprocket shaft 135 for rotation in the counterclockwise direction. The film 127 is then accumulated on a takeup spool 136 which is removably mounted on a powered spool shaft 137. It can be seen by reference to FIG. 8 that the supply spool 125 and takeup spool 136 both rotate in the clockwise direction. A conventional gear mechanism 138 of the type normally found in projectors and illustrated by the dotted line in FIG. 8, is connected to the shafts 137 and 135 and the claw 132 for actuating each of these members in a time related basis.

Located above the lens 130 with respect to the movement of the film 127 are a conventional lamp 139 and a photocell 140 which are disposed on opposite sides of the film 127. The lamp 139 is connected to a suitable source of electrical current (not shown) and is suitable to illuminate the frequency recorded on the permanent sound track 105 of the film 127. The photocell 140 is similar to the photocell 82 employed in the projector $P_1$. The photocell 140 is connected through an operational amplifier 141 to a recording head 142 which is located in contact with the surface of the auxiliary sound track 106. Thus as the photocell 140 detects a sound message on the sound track 105 it will transmit the same to the recording head 142 which will, in turn, record this same sound message on the auxiliary sound track 106.

A reproducing head 143 which resides in contact with the auxiliary sound track 106 will sense this sound message recorded on the track 106 by the head 142 and will enable an audio output from a conventional speaker 144. The reproducing head 143 is connected to the speaker 144 through an operational amplifier 145. An erase head 146 is located beneath the reproducing head 143 in the direction of movement of the film 127 and is operated by a bias oscillator 147 to erase the sound message on the auxiliary sound track 106 after the same has been reproduced and presented through the speaker 144.

It should be observed that the distance between the recording head 142 and the reproducing head 143 is substantially equal to the distance between the photocell 140 and the lens 130 as measured in the direction of movement of the film 127. Thus, when a portion of the film 127 is passed between the lamp 139 and the photocell 140 the message on the permanent sound track 105 will be read; and this occurs prior in time to the passage of the visual image frame 104 adjacent thereto between the lamp 131 and lens 130. The message thus read on the permanent sound track 105 is rerecorded on the auxiliary sound track 106 in magnetic format. As the visual image frame 104 associated with this message has moved between the lens 130 and lamp 131, the message rerecorded on the auxiliary track 106 will be located beneath the reproducing head 143. Thus this message on the auxiliary track will be reproduced and audiably presented simultaneously with the presentation of the image on the visual image frame 104.

It should be understood that changes and modifications may be made in the form, construction, arrangement and combination of parts presently described and pointed out in the claims without departing from and nature and principle of my invention.

Having thus described my invention, what I desire to claim and secure by letters patent is;

1. A system for synchronously presenting sound with respect to a visual image on a movable media and where the sound is related to said visual image, said system comprising;
   a. visual image affording means enabling the creation of a series of visual images with respect to a moving media,
   b. sound affording means operatively associated with said visual image affording means enabling the creation of frequencies representing sound with respect to said moving media and where the frequencies representing the sound are related to at least some of said series of visual images,
   c. said media having a photosensitive portion capable of having an image formed thereon, a temporary sound track essentially coplanar to said photosensitive portion and capable of having said frequencies recorded thereon, and a permanent sound track essentially coplanar to said photosensitive portion and capable of having said last-named frequencies transferred from said temporary track and recorded on said permanent track,
   d. means for erasing the frequencies on said temporary track after transferrance to said permanent track, and
   e. synchronization means operatively associated with said media for presenting said frequencies with respect to the proper visual image on said moving media so that said visual images and frequencies representing sound are located with respect to each other on a synchronous time basis.

2. The system of claim 1 further characterized in that the visual image affording means is a shutter mechanism.

3. The system of claim 1 further characterized in that gear coupling means is operatively connected to said visual image affording means and synchronizing means to drive said visual image affording means and synchronizing means on a time related synchronous basis.

4. In a camera including a shutter mechanism for recording a visual image on a radiation sensitive film with means for supplying the film to the shutter mechanism and removing the film therefrom, said film including an image portion, a substantially coplanar temporary sound track capable of having frequencies representing sound recorded thereon, and a permanent sound track substantially coplanar to said image portion and capable of having said last-named frequencies transferred from said temporary track and recorded on said permanent track, sound sensing means, first recording means operatively located with respect to said film for recording a sound message on said temporary sound track, second recording means operatively located with respect to said film and recording said message from said temporary sound track on said permanent sound track at a predetermined time with respect to the recording of the visual image on said film and after said film has moved a predetermined distance from said shutter mechanism, and means for erasing the sound message on said temporary track after recordation thereof on said permanent track.

5. The camera of claim 4 further characterized in that a separate sound reading member is connected to said second recording means and is located to read said message from said temporary sound track.

6. The camera of claim 4 further characterized in that said first recording means magnetically records said sound message on said temporary sound track and said second recording means optically records said sound message on said permanent sound track.

7. In a projector including a shutter mechanism for reproducing a visual image from a film with means for supplying the film to the shutter mechanism and means for removing the film therefrom, said film having a visual image track, a substantially coplanar temporary sound track capable of having frequencies of sound recorded thereon, and a permanent sound track substantially coplanar to said image track and having frequencies of sound recorded thereon, sound presenting means, first reproducing means operatively located with respect to said film for reproducing a sound message recorded on said permanent sound track, a recording member operatively associated with said first reproducing means for recording said sound message on said temporary sound track, when the visual image on said visual image track associated with said sound message is a predetermined distance from said shutter mechanism, second reproducing means located to read the message on said temporary sound track and being operatively connected to said sound presenting means to cause presentation of said sound message on a synchronous time basis with the said visual image, and erase means for erasing the message on the temporary sound track after the message has been reproduced by said second reproducing means.

8. The projector of claim 7 further characterized in that said erase means includes an erase head and a bias oscillator.

9. The projector of claim 7 further characterized in that said permanent sound track has the sound message optically recorded thereon and that said first reproducing means optically reproduces said sound message, said temporary sound track has the sound message magnetically recorded thereon and that said second reproducing means magnetically reproduces said sound message.

10. The method of recording sound on a movie film on a synchronous time basis with visual images recorded on a visual image track of said film and where said film has a contiguous temporary sound track and a contiguous permanent sound track, said method comprising:
   a. introducing said film into an image forming area and exposing said film to create a series of visual images on said visual image track,
   b. simultaneously recording a sound message associated with each visual image of said series of visual images on said temporary sound track,
   c. moving said film from said image forming area and simultaneously moving the temporary sound track therewith from the area where said sound message has been recorded thereon,
   d. reading the sound message recorded on said temporary sound track, e. recording said sound message on the permanent sound track of said film so that the sound message is located to be presented on a synchronous time basis with presentation of the visual image with which it is associated, and f. thereafter erasing said sound message from said temporary sound track after said sound message has been recorded on said permanent sound track.

11. The method of claim 10 further characterized in that the sound message is magnetically recorded on said temporary sound track and optically recorded on said permanent sound track.

12. The method of presenting sound from a movie film on a synchronous time basis with presentation of visual images recorded on a visual image track on said film and where the film includes a contiguous permanent sound track with a sound message recorded thereon and a temporary sound track capable of having said message recorded thereon, said method comprising:

a. reading a sound message recorded on said permanent sound track and which sound message is associated with a particular visual image recorded on said visual image track, b. recording said sound message from the permanent sound track onto the temporary sound track, c. moving portions of the visual images on said film visual image track into an image projecting area, d. simultaneously reading portions of the sound message recorded on said temporary sound track and which portions of the sound message are associated with the visual images moved into said image projecting area, e. reproducing said message read from said temporary sound track and presenting the sound message on said temporary sound track element at the time that said particular visual image is located in said image projecting area so that said message can be presented on a synchronous time basis with the projection of said visual image, and f. erasing the sound message recorded on said temporary sound track after presentation thereof.

13. The method of claim 12 further characterized in that the permanent sound track has the sound message optically recorded thereon and that the sound message is magnetically recorded on the temporary sound track.

UNITED STATES PATENT OFFICE
CERTIFICATE OF CORRECTION

Patent No. 3,591,266                Dated  July 6, 1971

Inventor(s)  Walter A. Ried

It is certified that error appears in the above-identified patent and that said Letters Patent are hereby corrected as shown below:

Column 1, line 59, after "visual" insert --image presented--.

Column 4, line 3, after "head" insert --and--.

Column 5, line 18, cancel "pro-";

Column 5, line 19, cancel "vided" and substitute --powered--.

Column 5, line 42, "general" should be --generate--.

Column 6, line 39, "$C_2$generally" should be --$C_2$ generally--.

Column 7, line 24, "employed" should be --employs--.

Column 7, line 41, cancel "A".

Column 8, line 2, "photocell 82 82" should be --photocell 82--.

Column 12, line 27, after "mechanism" and before "and" there should be a comma.

Signed and sealed this 14th day of March 1972.

(SEAL)
Attest:

EDWARD M. FLETCHER, JR.  
Attesting Officer

ROBERT GOTTSCHALK  
Commissioner of Patents